(12) United States Patent
Lahmer

(10) Patent No.: US 10,391,927 B2
(45) Date of Patent: Aug. 27, 2019

(54) VEHICLE HEADLIGHT

(71) Applicant: ZKW GROUP GMBH, Wieselburg (AT)

(72) Inventor: Martin Lahmer, Munichreith (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/308,500

(22) PCT Filed: May 22, 2017

(86) PCT No.: PCT/AT2017/060135
§ 371 (c)(1),
(2) Date: Dec. 10, 2018

(87) PCT Pub. No.: WO2017/214649
PCT Pub. Date: Dec. 21, 2017

(65) Prior Publication Data
US 2019/0161001 A1    May 30, 2019

(30) Foreign Application Priority Data

Jun. 13, 2016 (AT) .................................. 50532/2016

(51) Int. Cl.
*B60Q 1/04* (2006.01)
*B60Q 1/14* (2006.01)
(Continued)

(52) U.S. Cl.
CPC ........... *B60Q 1/1415* (2013.01); *B60Q 1/076* (2013.01); *F21S 41/645* (2018.01); *F21S 41/675* (2018.01); *G02B 26/0841* (2013.01)

(58) Field of Classification Search
CPC . B60Q 1/02; B60Q 1/04; B60Q 1/076; B60Q 1/1415; B60Q 2400/50;
(Continued)

(56) References Cited

U.S. PATENT DOCUMENTS 7,227,611 B2 * 6/2007 Hull ...................... B60Q 1/085
352/49
9,702,519 B2 * 7/2017 Reiners ................... F21S 41/16
(Continued)

FOREIGN PATENT DOCUMENTS

DE   102015209194 A1   11/2015
EP       1316474 A2    6/2003
(Continued)

OTHER PUBLICATIONS

Search Report for Austrian Application No. A 50532/2016 dated Mar. 24, 2017.
(Continued)

*Primary Examiner* — Haissa Philogene
(74) *Attorney, Agent, or Firm* — Eversheds Sutherland (US) LLP

(57) ABSTRACT

The invention relates to a vehicle headlight (1) comprising a light source (2), a primary optical system (3), a projection optical system (4), a control device, an output unit and an optoelectronic component (7) having a controllable arrangement of several, individually adjustable optoelectronic elements (8) in the form of a two-dimensional matrix. Said vehicle headlight (1) is designed to emit light from at least one light source (2) in the direction of the optoelectronic component (7) and to modulate by means of the optoelectronic component (7), and to radiate at least partially in the direction of the projection optical system (4) and to form a light image in front of the vehicle. The control device is connected to the output unit. The output unit is connected to the optoelectronic component (7) and can control the optoelectronic elements (8). A light model is stored in the control device in the form of a plurality of protection points, and the control device is designed to form, from the light model, image data in the form of a two-dimensional matrix-shaped situation light distribution with a situational image resolu-
(Continued)

tion. The situational image resolution is essentially higher than the plurality of protective points of the light model. The image data is formed, preferably by interpolation from the protective points and can be represented on the optoelectronic component (7) by means of the output unit.

17 Claims, 3 Drawing Sheets

(51) Int. Cl.
*F21S 41/64* (2018.01)
*G02B 26/08* (2006.01)
*B60Q 1/076* (2006.01)
*F21S 41/675* (2018.01)

(58) Field of Classification Search
CPC ........ F21S 41/16; F21S 41/147; F21S 41/645; F21S 41/663; F21S 41/675; H05B 37/02; H05B 37/029; H05B 37/0218
See application file for complete search history.

(56) References Cited

U.S. PATENT DOCUMENTS

| | | |
|---|---|---|
| 10,195,980 B2 * | 2/2019 | Widdowson ......... B60Q 1/0011 |
| 10,207,630 B2 * | 2/2019 | Reisinger ........... G02B 27/0983 |
| 2004/0114379 A1 | 6/2004 | Miller et al. |
| 2008/0198372 A1 | 8/2008 | Pan |
| 2011/0205223 A1 | 8/2011 | Lee |
| 2015/0048736 A1 | 2/2015 | Foltin |

FOREIGN PATENT DOCUMENTS

| | | |
|---|---|---|
| EP | 2479064 A1 | 7/2012 |
| JP | 2012190594 A | 10/2012 |
| WO | 2015032795 A2 | 3/2015 |

OTHER PUBLICATIONS

International Search Report for PCT/AT2017/060135 dated Oct. 4, 2017.

* cited by examiner

VEHICLE HEADLIGHT

FIELD OF THE INVENTION

The invention relates to a vehicle headlight comprising at least one light source, at least one projection optical system, at least one control device, at least one output unit and at least one optoelectronic component having a controllable arrangement of several, individually adjustable optoelectronic elements in the form of a two-dimensional matrix, wherein an image resolution is defined by the product of the number of rows and columns of the matrix, and the vehicle headlight is designed to emit light from the at least one light source in the direction of the at least one optoelectronic component and to modulate the light by means of the at least one optoelectronic component, and to radiate it at least partially in the direction of the at least one projection optical system and form a light image in front of the vehicle, wherein the at least one control device is connected to the at least one output unit, and the at least one output unit is connected to the at least one optoelectronic component and can actuate the optoelectronic elements.

Furthermore, the invention relates to a method for generating a light distribution in front of a vehicle by means of a vehicle headlight of the above-mentioned type.

BACKGROUND OF THE INVENTION

In the development of current headlight systems, the foremost wish is increasingly to be able to project a light image having the highest possible resolution onto the roadway, light image which can be changed quickly and adapted to the respective traffic, road and light conditions. The term "roadway" is used here to simplify the description since, obviously, it depends on the local circumstances whether a light image is in fact on the roadway or extends beyond it. In principle, the light image is described based on a projection onto a vertical surface in compliance with the applicable regulations applying to passenger car lighting technology.

In order to satisfy this mentioned requirement, headlights have been developed, among others, in which a variably actuatable reflector surface is formed from a plurality of micromirrors and reflects a light emission generated by a light source in the emission direction of the headlight. Such lighting devices are advantageous in vehicle manufacture because of their highly flexible lighting functions, since the illumination intensity can be regulated individually for different light areas, and any desired lighting functions with different light distributions can be implemented such as, for example, a low-beam light distribution, a cornering-light light distribution, a city-light light distribution, a highway-light light distribution, a bending-light light distribution, a high-beam light distribution, or the formation of a glare-free high-beam.

For the micromirror arrangement, the so-called Digital Light Processing (DLP®) projection technology is used, in which images are generated in that a digital image is modulated onto a light beam. In the process, a rectangular arrangement of movable micromirrors, also referred to as pixels, which breaks up the light beam into sections and subsequently reflects it outward pixelwise into the projection path or out of the projection path.

The basis for this technology is formed by an electronic component which contains the rectangular arrangement in the form of a matrix of mirrors and their control technology and which is referred to as "Digital Micromirror Device" (DMD).

A DMD microsystem is a spatial light modulator (SLM) which consists of micromirror actuators, that is to say tiltable mirror surfaces arranged in the form of a matrix, having, for example, an edge length of approximately 16 µm. The mirror surfaces are constructed in such a way that they are movable due to the action of electrostatic fields. The angle of each micromirror is individually adjustable and each micromirror as a rule has two stable end states, between which it is possible to switch up to 5000 times within one second. The individual micromirrors can be actuated, for example, in each case by pulse width modulation (PWM) in order to represent, in the principal beam direction of the DMD arrangement, additional states of the micromirrors, whose time-averaged reflectivity lies between the two stable states of the DMD. The number of mirrors corresponds to the resolution of the projected image, wherein a mirror can represent one or more pixels. In the meantime, DMD chips with high resolutions in the megapixel range have become available. The technology underlying the adjustable individual mirrors is the micro-electro-mechanical-systems (MEMS) technology.

While the DMD technology has two stable mirror states, and the reflection factor can be set by modulation between the two stable states, the Analog Micromirror Device (AMD) technology has the property that the individual mirrors can be set in variable mirror positions which are in each case in a stable state there.

In the case of such vehicle headlights which can project several different high-resolution light distributions onto the roadway in front of the vehicle, there is a significant memory requirement. Control devices for micromirror arrangements are often implemented as an "embedded system." Often such embedded systems are adapted specifically to a task and, for cost reasons, an optimized mixed hardware-software implementation is chosen. Therefore, in practice, the computing power and the available memory are often limited. It is often a disadvantage to use an additional external memory, since not only does the memory generate costs, but also the complexity of the "embedded system" is significantly increased, or respectively is not available commercially in the certification required for automobile applications.

SUMMARY OF THE INVENTION

The aim of the invention is to overcome the mentioned disadvantages.

The aim is achieved by a headlight of the type mentioned at the start in that, according to the invention, in the at least one control device, at least one light model in the form of a plurality of nodes is stored, and the at least one control device is designed to form, from the at least one light model, image data in the form of a two-dimensional matrix-like situational light distribution with a situational image resolution which is defined by the product of the number of rows and columns of the situational light distribution, wherein the situational image resolution is substantially higher, preferably at least a hundred times higher, particularly preferably at least ten thousand times higher than the plurality of the nodes of the light model, and the image data is formed preferably by interpolation from the nodes, and the image data can be represented by means of the at least one output unit on the at least one optoelectronic component.

By using a light model in the form of a plurality of nodes, the necessary memory requirement for storing one or more light distributions can be significantly reduced. Light distributions can have brightness patterns with a simple pattern which can be described very simply using two-dimensionally curved surfaces. These surfaces in turn can be described by a plurality of nodes, whose number and consequently whose memory requirement are considerably lower than those of the light distribution described via image data with high resolution. This results in a drastically reduced memory requirement which can be met, for example, by a conventional "embedded system," as control device. It is clear that the necessary memory can be either on a microprocessor chip or on a separate memory chip.

The nodes can be defined, for example, in the form of a two-dimensional matrix. If the number of nodes is selected to be lower than the number of rows and columns of the situational light distribution by a factor of at least ten in each case with respect to the rows and columns of the matrix, the result is a reduction of the necessary memory requirement by a factor of at least a hundred. If the number of nodes is selected to be lower than the number of rows and columns of the situational light distribution by the factor of at least a hundred, the result is a reduction in the necessary memory requirement by a factor of at least ten thousand.

Furthermore, the aim is achieved by a method of the type mentioned at the start, in that, according to the invention, a headlight as described above generates a light distribution of the above-mentioned type. The advantages resulting from the method correspond to the advantages of the vehicle headlight according to the invention, so that, below, only the advantages of the vehicle headlight are described, and the advantages achieved apply correspondingly also to the inventive method In order to compute the necessary image data with high resolution, it is advantageous if the interpolation of values between nodes occurs linearly, since the computation can then be carried out in a particularly simple manner and can occur, for example, by means of a commercial cost-effective "embedded system." It is clear that the computation of the image data can be carried out, for example, by one or more processors or computation units. The computation can in other words be carried out on a single microprocessor or also on a logical computation unit organized in a distributed system architecture.

If, in special applications, particularly consistent light distributions are desired, or if the design of, for example, a sharp light-dark boundary of a low beam is necessary, then other interpretation methods such as, for example, splines or piece-by-piece interpolations can be used. In the same way, simpler interpolation methods are conceivable such as, for example, a constant course starting from a node to immediately before the next node.

It is highly advantageous if the nodes are defined by reflection values or transmission values of the optoelectronic elements. Thereby, the image data can be used directly for the actuation of the output unit, without a conversion or adaptation of for example, absolute or relative brightness values having to occur, and a saving of computation time can be achieved.

The computation methods within the control unit can be kept particularly simple if the distances between nodes are of equal size, since the respective distance of the computed point for image data with high resolution between nodes needs to be computed only a single time. In other words, the nodes are transformed by a simple linear image transformation to the image resolution of the optoelectronic component in the form of a single computation (for example, a linear interpolation), in that, for only one node, the increments are determined in row or column direction, which then are also valid for all the other nodes. Thereby, both the computation time and the programming expense can be kept low.

It is particularly advantageous if the situational light distribution is a light distribution of a low beam or a high beam, since the light distributions are defined beforehand by appropriate standards and optionally differences between different national standards can as a result be easily taken into consideration.

In an advantageous development of the invention, the output unit is designed to transmit image data by means of at least one data signal, wherein the at least one data signal comprises a time slot in which image information of the image data is transmitted, and the time slot is delimited by a back signal shoulder of the image information and a front signal shoulder of the subsequent image information, and the computation of the situational light distribution is carried out in this time slot.

The computation of the situational light distribution occurs in a time interval in which the occupation of the control unit by the computation of the image information is optimally positioned, and, outside of this time slot, the control unit can be used for other computations or controls of the vehicle headlight.

It is decidedly advantageous if the at least one light source comprises a semi-conductor light emitting diode, in particular a high-current light emitting diode or a laser diode, since a small installation size in the vehicle headlight can be achieved. In addition, the light is generated with a high degree of efficiency, and the heat release of the light source is reduced, which is very important particularly in the use of temperature-sensitive AMDs or DMDs.

BRIEF DESCRIPTION OF THE DRAWINGS

The invention and its advantages are described in further detail below in reference to non-limiting embodiment examples illustrated in the appended drawings. In the drawings.

DETAILED DESCRIPTION OF THE DRAWINGS

Embodiment examples of the invention will now be explained in further detail in reference to FIG. 1 to FIG. 7. In particular, important parts for the invention in a headlight are represented, wherein it is clear that a headlight additionally contains many other parts which are not shown and which allow an appropriate use in a motor vehicle, in particular a passenger car or motorcycle. For the sake of clarity, cooling devices for components, control electronics, additional optical elements, mechanical adjustment devices or holders are therefore not shown.

The embodiment examples at the same time illustrate the method according to the invention for generating a light distribution in front of a vehicle by means of a vehicle headlight of the type described here.

It is clear that the embodiment examples and the features thereof represent the invention individually and can also be combined with one another.

Figure 1:
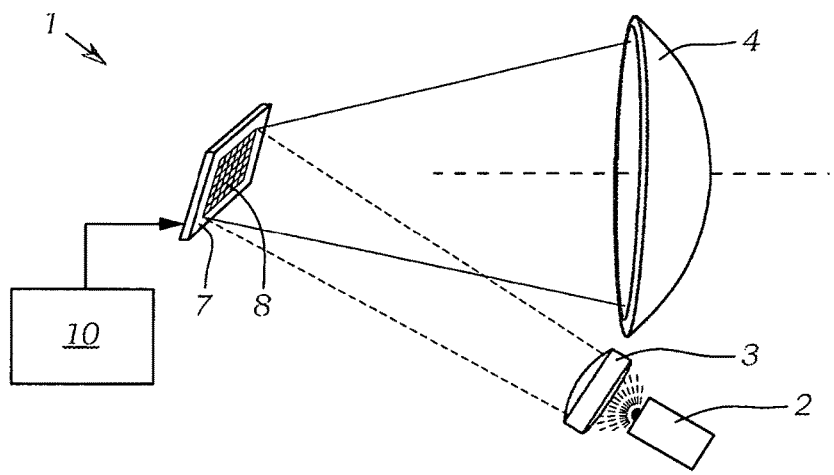
FIG. 1 shows a perspective representation of a first embodiment of a vehicle headlight according to the invention.

FIG. 1 shows a first embodiment of a vehicle headlight 1 according to the invention. A light source 2, which can contain, for example, a light emitting diode or power LED as well as a primary optical system 3 for bundling a light beam, is designed to illuminate an optoelectronic component 7.

The optoelectronic component 7 can comprise multiple optoelectronic elements 8 arranged in a two-dimensional matrix. In this first embodiment example, the optoelectronic elements 8 are micromirrors which can be actuated individually, wherein the reflection action of each individual element of the matrix can be adjusted variably (for example, an AMD or DMD).

The optoelectronic component 7 can reflect the incident light in the direction of a projection optical system 4, wherein the controlled matrix elements individually adjust their reflection factor by modulation of the angles of the micromirrors and modulate a desired light distribution onto the incident light beam. The projection optical system 4 is oriented in the emission direction of the vehicle headlight 1 and consequently generates the desired light distribution in front of the vehicle.

The actuation of the optoelectronic component 7 occurs by the actuation unit 10, in which a desired light distribution can be computed and the actuation of the optoelectronic elements 8 required for this purpose is output in the form of control signals to the optoelectronic component 7.

Figure 2:
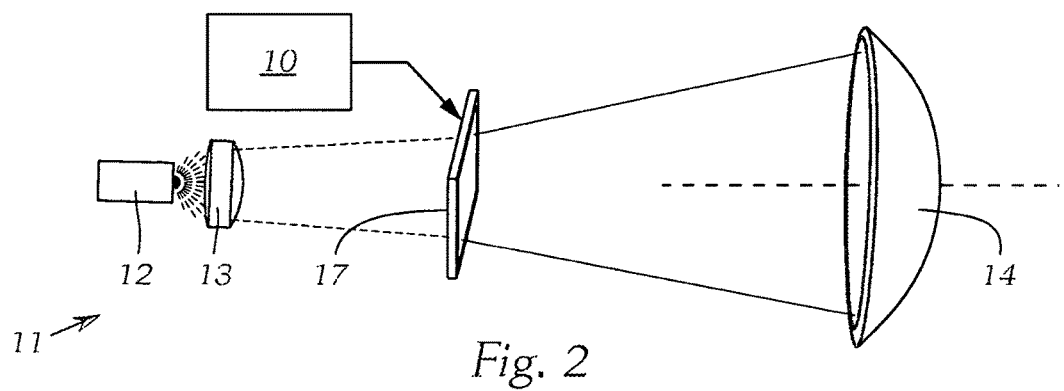
FIG. 2 shows a perspective representation of a second embodiment of a vehicle headlight according to the invention.

FIG. 2 shows a second embodiment of a vehicle headlight 11 according to the invention. A light source 12, which can contain, for example, a light emitting diode, a high-current LED (power LED) or a laser diode, and a primary optical system 13 for bundling the light beam coming from the light source 12, is designed to illuminate an optoelectronic component 17.

The optoelectronic component 17 comprises multiple optoelectronic elements arranged in a two-dimensional matrix. In this second embodiment example, the optoelectronic elements 8 are individually actuatable light-permeable elements, in which the light transparency of each individual element of the matrix is variably adjustable (for example, an LCD).

The optoelectronic component 17 can allow the incident light to pass through in the direction of a projection optical system 14, wherein the controllable matrix elements individually adjust their light transparency and modulate a desired light distribution onto the incident light beam. The projection optical system 14 is oriented in the emission direction of the vehicle headlight 11 and consequently generates the designed light distribution in front of the vehicle.

The actuation of the optoelectronic component 17 occurs by the actuation unit 10a, in which a light distribution can be computed, and the actuation of the optoelectronic elements, which is required for this purpose, is output, for example, the pixels of an LCD, in the form of control signals to the optoelectronic component 17.

In addition to the variants of the optoelectronic component 7, 17 shown in FIG. 1 and FIG. 2, other technologies which enable a corresponding modulation of the light can naturally also be used, which enable a corresponding modulation of the light. For the sake of completeness, LCoS (Liquid Crystal on Silicon) systems should therefore also be mentioned.

The modulation of the light enables a segmenting of the light distribution on the roadway, that is to say the light distribution projected onto the roadway can be individually controlled for different solid angles. For a light image projected onto a roadway, the number of segments that can be actuated individually by a vehicle headlight according to the invention is important in order to generate individually adapted light distributions for different driving situations. The number of these segments depends, for example, on the number of micromirrors and is, for example, 854×480 micro mirrors or pixels in a rectangular matrix arrangement.

If, for vehicles, two headlights are used, the segments can be arranged in a row one after the other, and the number of the segments can be doubled. Usually, in the installation position of the vehicle headlight, multiple segments in horizontal and also in vertical direction are necessary. For this reason, in practice, the light distributions of two vehicle headlights, segmented by the optoelectronic components, are frequently arranged in a row one after the other on the short side of the matrix arrangement and thus the horizontal resolution is doubled.

A complete or only partial superposition or overlap of two or more light distributions is possible, in order to achieve, for example, stronger contrast in image areas.

Figure 3:
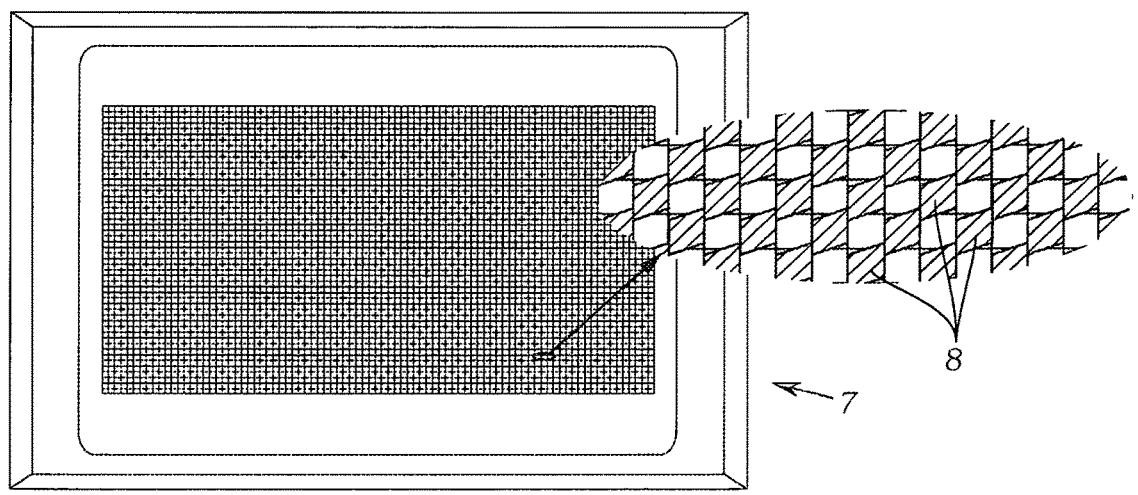
FIG. 3 shows a view from front onto an optoelectronic component with an enlarged detail representation of contained optoelectronic elements.

In FIG. 3, an example of an optoelectronic component 7 in the form of a DMD is shown in a front view. An enlarged image detail shows optoelectronic elements 8 arranged in the form of a matrix, which comprise individually controllable micromirrors, wherein every other micromirror is tilted in this example.

Figure 4:
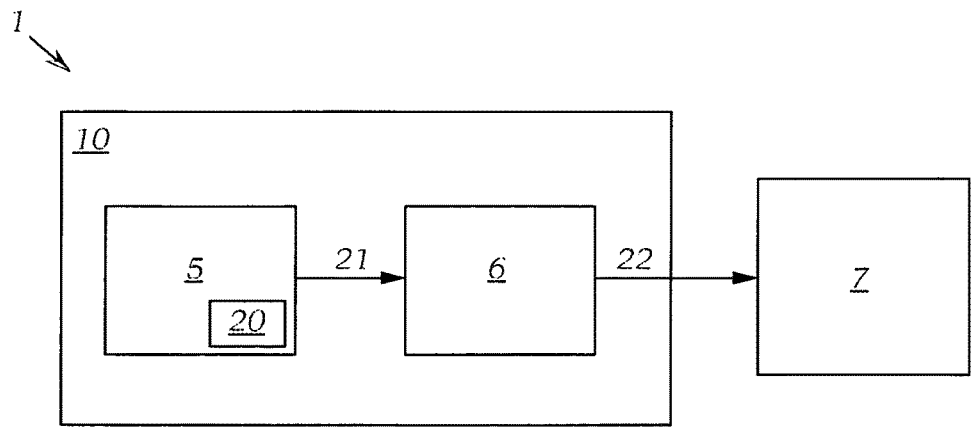
FIG. 4 shows a block diagram of the circuit of a vehicle headlight according to the invention.

FIG. 4 shows a block diagram of the electrical circuit of the vehicle headlight 1 according to the invention. A control device 5 can compute, from a light model 20, a light distribution in the form of image data 21 and output said light distribution via an output unit 6 in the form of video signals 22 to the optoelectronic component 7. The control device 5 together with the output unit 6 forms the actuation unit 10 to which the optoelectronic component 7 is connected. The memory necessary for the control device 5 can be located on a microprocessor chip and also on a separate chip or memory chip. In addition, the control device 5 can comprise an interface through which, for example, the light models 20 can be transmitted to the control device 5.

Figure 5:
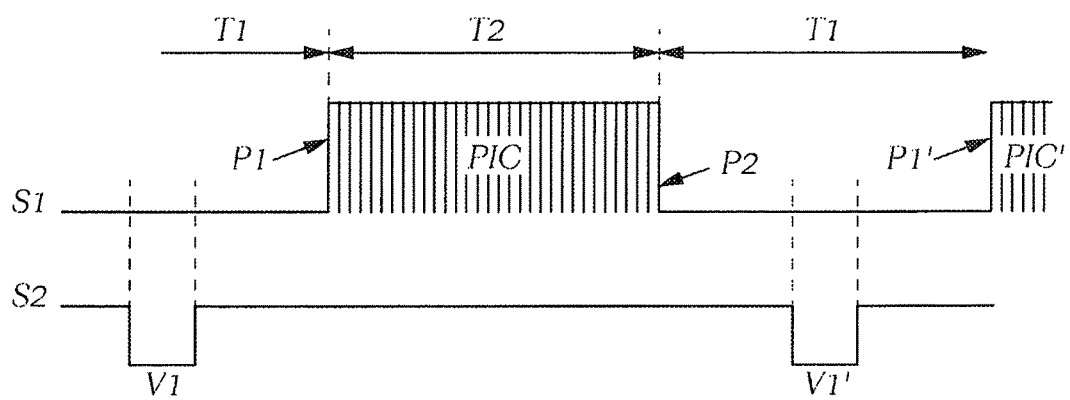
FIG. 5 shows a temporal course of signals for controlling the optoelectronic component according to FIG. 4.

In FIG. 5, signal courses in the time domain for a data signal S1 as well as a V-Sync control signal S2 with synchronization pulses V1, V1' of a video signal are represented. The control device 5 repeatedly performs new computations of the desired light distribution, in order to take into account the respective driving situation of the vehicle and compute the respective necessary light distribution. The control device 5 transmits the computed light distribution in the form of image data 21 to the output unit 6 which in turn transmits the image data in the form of video signals 22 comprising a data signal S1 and a V-Sync signal S2 to the optoelectronic component 7. Often, video signals 22 comprise a signal frequency in order, for example, to achieve an image repetition frequency of 25 images per second, for example. For illustration, in FIG. 5, two successive time slots T1 and T2 are shown. The time slot T1 starts with an end of a transmission of image information and lasts until the beginning of the transmission of subsequent image information of the image data 21 in the data signal S1. The time slot T2 starts after the end of time slot T1 and lasts until the end of the transmission of image information from the image data 21 in the data signal S1.

In other words, the output unit 6 is designed to transmit image signals by means of at least one data signal S1 to the optoelectronic component 7, 17, and the at least one data signal S1 includes a time slot T2 which is located between a front signal shoulder P1 and a back signal shoulder P2 of the image information PIC in the data signal S1. The time slot T1 is located between a back signal shoulder P2 of the image information PIC and a front signal shoulder P1' of the subsequent image information PIC' in the data signal S1. Each driving situation can require a new computation of the light distribution, for example, when a driver of a vehicle switches from a low beam function to a high beam function of the vehicle headlight. This switch has to occur very rapidly, wherein the computation capacity of the control device 5 necessary for this process should be taken into consideration. Here, it is particularly advantageous if the computation of the situational light distribution is carried out in the time slot T1, since at this time no image data is transmitted, and a computation capacity on the part of the control device 5 may be available. The time slot T1 is located between the back signal shoulder P2 ("back porch") and the front signals shoulder P1' ("front porch"). Depending on a desired image repetition rate, only a few milliseconds remain in the time slot T1 for the computation of the light distribution. For example, in the case of a video signal comprising image information of 640×480 pixels and having an image repetition rate of 60 Hz, the time slot T1 extends for approximately 1.4 ms between the back signal shoulder P2 of the image information PIC and the front signal shoulder P1' of the subsequent image information PIC'.

Figure 6:
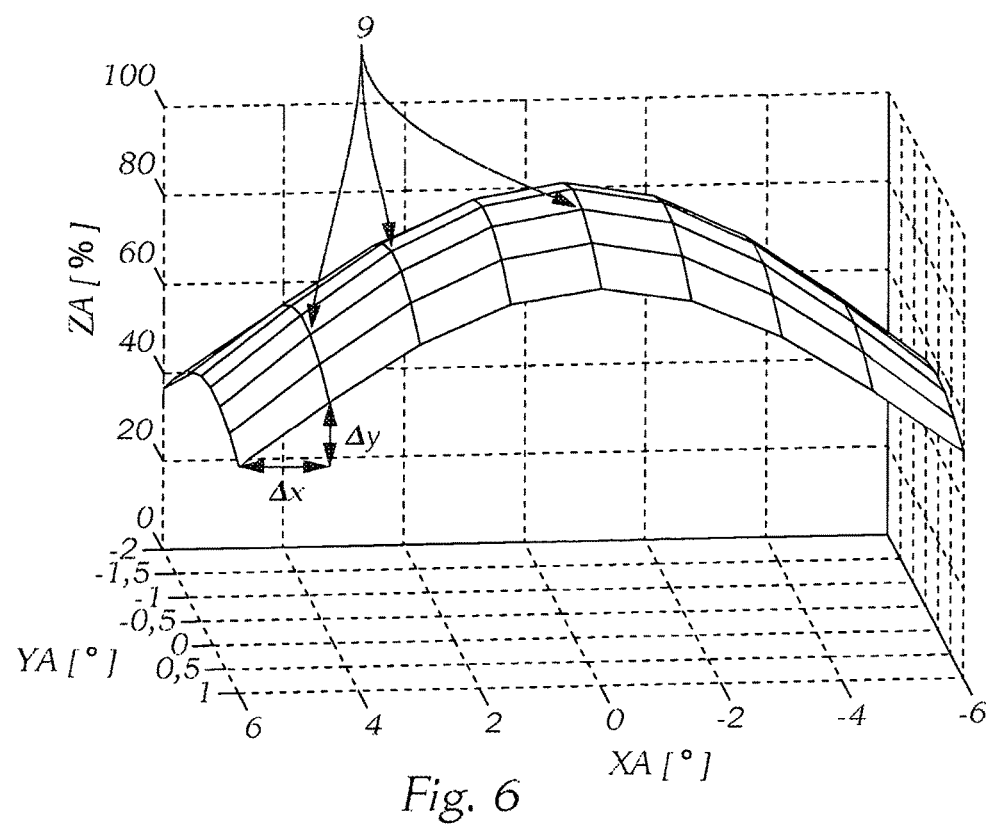
FIG. 6 shows a perspective representation of a computed light distribution of a vehicle headlight according to the invention.

FIG. 6 shows a three-dimensional representation of an example for a computed light distribution, for example, the light distribution of a high beam. On the axes of the coordinate system shown, on the XA and YA axes, the horizontal and vertical position of the respective brightness value (or dim value), which is plotted on the ZA axis, is shown.

Other light distributions are equally possible, such as the light distribution of a low beam, a bending light, etc.

The light distribution can be described by nodes 9. Each node 9 comprises, for example, a data set (X, Y, Z), wherein Z is the desired brightness value in the position (X, Y). By interpolation between the nodes, additional brightness values can be computed. Here, different interpolation methods are possible. When using a linear interpolation, the slopes between the nodes 9 are computed, and, in the computation of points located between the two nodes 9, the respective identical slopes are used in order to keep the computation itself particularly easy. This can be necessary if the computation capacity of the control device 5 is limited. The time slot T1 is particularly advantageous for the computation and can advantageously be used in that computations for light distributions are performed in the time slot T1.

The values of the individual matrix elements of the optoelectronic component 7, 17 can correspond to an absolute or relative brightness in the computed light distribution. Furthermore, the values can correspond to a set value of a respective optoelectronic element 8, for example to values between 0 and 255, to the reflection factor, or to brightness values or dim values between 0% for dark and 100% for bright. Depending on the definition of these values, which are specified by the DMD system, it can be necessary that the optoelectronic component 7 performs an adaptation to adjustment ranges of the optoelectronic elements 8.

In some DMD systems, the modulation of the light occurs by high-frequency tilting of the respective micromirrors in the sense of a pulse width modulation (PWM), wherein the working cycle ("duty cycle") is adapted; for example, for a 70% dimming, the micromirrors are moved in a 70/30 cycle between two stable mirror states. Tilting frequencies are commonly up to 200 Hz, 1 kHz or 10 kHz. Alternatively, the set values of the individual matrix elements of the optoelectronic component 7, 17 can correspond to the positions of micromirrors or tilting frequencies of the micromirrors.

Figure 7:
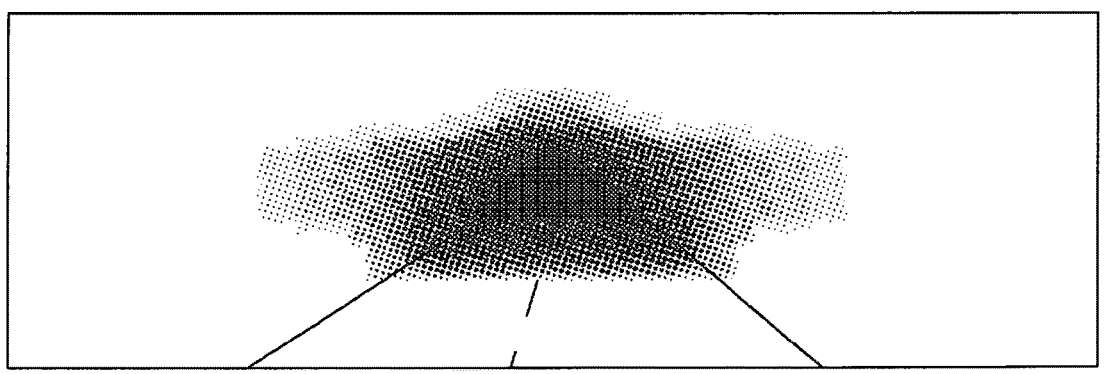
FIG. 7 shows a representation of a light distribution of a vehicle headlight according to the invention.

FIG. 7 shows, for example, a high-resolution light distribution of a low beam on a road, which was generated by the arrangement according to the invention, wherein areas shown in as dark stand for areas of high brightness. The representation shown is thus the inverse of a brightness distribution.

LIST OF REFERENCE NUMERALS 1, 11 Vehicle headlight
2, 12 Light source
3, 13 Primary optical system
4, 14 Projection optical system
5 Control device
6 Output unit
7, 17 Optoelectronic component
8 Optoelectronic element
9 Nodes
10, 10a Actuation unit
20 Light model
21 Image data
22 Video signal
S1 Data signal
S2 V Sync signal
T1 Time slot 1
T2 Time slot 2
P1, P1' Front signal shoulder ("front porch")
P2 Back signal shoulder ("back porch")
V1, V1' Video synchronization pulse
PIC, PIC' Image information
X, Y, Z Coordinates
XA, YA, ZA Axes

The invention claimed is:
1. A vehicle headlight (1, 11) comprising:
at least one light source (2, 12);
at least one projection optical system (4, 14);
at least one control device (5);
at least one output unit (6); and
at least one optoelectronic component (7, 17) having a controllable arrangement of several individually adjustable optoelectronic elements (8) in the form of a two-dimensional matrix, wherein an image resolution is defined by the product of the number of rows and columns of the matrix,
wherein the vehicle headlight (1, 11) is configured to emit light from the at the least one light source (2, 12) in the direction of the at least one optoelectronic component (7, 17) and to modulate the light by the at least one optoelectronic component (7, 17), and to radiate it at least partially in the direction of the at least one projection optical system (4, 14) and form a light image in front of a vehicle,
wherein the at least one control device (5) is connected to the at least one output unit (6), and the at least one output unit (6) is connected to the at least one optoelectronic component (7, 17) for actuating the optoelectronic element (8), and wherein:
on a side of the at least one control device (5), at least one light model (20) is stored in the form of a plurality of nodes (9),
the at least one control device (5) is designed to form, from the at least one light model (20), image data (21) in the form of a two-dimensional matrix-like situational light distribution with a situational image resolution which is defined by the product of the number of rows and columns of the situational light distribution, wherein the situational image resolution is substantially higher than the plurality of nodes (9) of the light model, and the image data (21) is formed by interpolation from the nodes (9), and
the image data (21) is transmitted from the at least one control device (5) to the at least one optoelectronic component (7, 17) by the at least one output unit (6).

2. The vehicle headlight (1, 11) according to claim 1, wherein the interpolation of values between respective adjacent nodes (9) occurs linearly.

3. The vehicle headlight (1, 11) according to claim 1, wherein the nodes (9) are defined by reflection values or transmission values of the optoelectronic elements (8).

4. The vehicle headlight (1, 11) according to claim 1, wherein the distances between respective adjacent nodes (9) are of equal size.

5. The vehicle headlight (1, 11) according to claim 1, wherein the situational light distribution is a light distribution of a low beam or high beam of a vehicle.

6. The vehicle headlight (1, 11) according to claim 1, wherein the output unit (6) is configured to transmit image data (21) to the optoelectronic component (7, 17) by at least one data signal (S1), and the at least one data signal (S1) includes a time slot (T1) located between a back signal shoulder (P2) of the image information PIC and a front signal shoulder (P1') of the subsequent image information PIC' in the data signal (S1), wherein the computation of the situational light distribution is carried out in the time slot (T1).

7. The vehicle headlight (1, 11) according to claim 1, wherein the at least one light source (2) comprises a semiconductor light emitting diode, in particular a high-current light emitting diode or a laser diode.

8. The vehicle headlight (1, 11) according to claim 1, wherein the situational image resolution is at least a hundred times higher than the plurality of nodes (9) of the light model.

9. The vehicle headlight (1, 11) according to claim 1, wherein the situational image resolution is at least ten thousand times higher than the plurality of nodes (9) of the light model.

10. A method for generating at least one light distribution with a vehicle headlight (1, 11) of a vehicle, the vehicle headlight comprising at least one light source (2, 12), at least one projection optical system (4, 14), at least one control device (5), at least one output unit (6) and at least one optoelectronic component (7, 17) having a controllable arrangement of several individually adjustable optoelectronic elements (8) in the form of a two-dimensional matrix, wherein an image resolution is defined by the product of the number of rows and columns of the matrix, wherein the vehicle headlight (1, 11) is configured to emit light from the least one light source (2, 12) in the direction of the at least one optoelectronic component (7, 17) and to modulate the light by the at least one optoelectronic component (7, 17), and to radiate it at least partially in the direction of the at least one projection optical system (4, 14) and form a light image in front of the vehicle, and wherein the at least one control device (5) is connected to the at least one output unit (6), the at least one output unit (6) is connected to the at least one optoelectronic component (7, 17) and actuates the optoelectronic elements (8), the method comprising:
storing on the side of the at least one control device (5), at least one light model (20); and
forming image data, by the at least one control device (5), from at least one light model (20) which is stored on the control device side in the form of a plurality of nodes (9) in a memory associated with the control device (5), the image data (21) being in the form of a two-dimensional matrix-like situational light distribution with a situational image resolution which is defined by the product of the number of rows and columns of the situational light distribution,
wherein:
the situational image resolution is substantially higher than the plurality of nodes (9) of the light model,
the image data (21) is formed by interpolation from the nodes (9), and
the image data (21) is represented on the at least one optoelectronic component (7, 17) by the at least one output unit (6).

11. The method according to claim 10, wherein the distances between respective adjacent nodes (9) are of equal size.

12. The method according to claim 10, wherein the situational light distribution is a light distribution of a low beam or high beam of a vehicle.

13. The method according to claim 10, wherein the output unit (6) transmits image data (21) by at least one data signal (S1) to the optoelectronic component (7, 17), and the at least one data signal (S1) includes a time slot (T1) which is located between a back signal shoulder (P2) of the image information PIC and a front signal shoulder (P1') of the image information PIC' in the data signal (S1), wherein the computation of the situational light distribution is carried out in the time slot (T1).

14. The method according to claim 10 wherein the interpolation of values between respective adjacent nodes (9) occurs linearly.

15. The method according to claim 10, wherein the nodes (9) are defined by reflection values or transmission values of the optoelectronic elements (8).

16. The method according to claim 10, wherein the situational image resolution is at least a hundred times higher than the plurality of nodes (9) of the light model.

17. The method according to claim 10, wherein the situational image resolution is at least ten thousand times higher than the plurality of nodes (9) of the light model.

* * * * *